US009405665B1

(12) United States Patent
Shashi et al.

(10) Patent No.: US 9,405,665 B1
(45) Date of Patent: Aug. 2, 2016

(54) APPLICATION TESTING BASED ON USER INPUT CAPTURED DURING A TRIAL PERIOD AND PRIORITY SCHEME ANALYSIS

(71) Applicant: Amazon Technologies, Inc., Seattle, WA (US)

(72) Inventors: Bhushan Chandramouli Shashi, Karnataka (IN); Suresh Reddy Guruva Reddy, Karnataka (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/720,478

(22) Filed: May 22, 2015

(51) Int. Cl.
  G06F 9/44 (2006.01)
  G06F 11/36 (2006.01)
  G06F 17/30 (2006.01)

(52) U.S. Cl.
  CPC ........ G06F 11/3688 (2013.01); G06F 11/3664 (2013.01); G06F 17/30327 (2013.01)

(58) Field of Classification Search
  CPC ............ G06F 11/3688; G06F 11/3664; G06F 17/30327
  USPC .................................. 717/124, 125
  See application file for complete search history.

(56) References Cited

U.S. PATENT DOCUMENTS

| | | | | |
|---|---|---|---|---|
| 6,061,643 A * | 5/2000 | Walker | ................ | G06F 11/3688 702/123 |
| 6,192,108 B1 * | 2/2001 | Mumford | .............. | H04M 3/242 379/10.03 |
| 6,301,701 B1 * | 10/2001 | Walker | ................ | G06F 11/3688 702/123 |
| 6,587,969 B1 * | 7/2003 | Weinberg | ............ | G06F 11/3688 714/38.13 |
| 6,937,972 B1 * | 8/2005 | Van Ee | .................... | G08C 19/28 703/20 |
| 8,627,288 B2 * | 1/2014 | Kimball | ............. | H04L 41/0853 717/124 |
| 8,997,053 B2 * | 3/2015 | Yanes | ................. | G06F 11/3664 717/125 |
| 2004/0073475 A1 * | 4/2004 | Tupper | ................... | G06Q 50/22 703/2 |

OTHER PUBLICATIONS

Memon et al. "Hiearchical GUI Test Case Generation Using Automated Planning" ISS Transactions of Software Engineering, Feb. 2001.*

Memon et al. "Regression Testing of GUIs"ESEC/FSE'03, Sep. 105, 2003.*

* cited by examiner

*Primary Examiner* — Chameli Das
*Assistant Examiner* — Viva Miller
(74) *Attorney, Agent, or Firm* — Thorpe North & Western

(57) ABSTRACT

Technology is described for testing functionality of an application. A plurality of user interactions with application elements of an application may be captured. Application elements of the application may be prioritized in accordance with a defined priority scheme. Each application element may be associated with a number of captured user interactions. A subset of captured user interactions associated with the application elements that are prioritized using the defined priority scheme may be identified. The subset of captured user interactions may be provided for playback based on a priority order of the application elements in order to verify a functionality of the application.

6 Claims, 9 Drawing Sheets

APPLICATION TESTING BASED ON USER INPUT CAPTURED DURING A TRIAL PERIOD AND PRIORITY SCHEME ANALYSIS

BACKGROUND

Application testing is a process in which applications that are executable in a computing environment may be tested for desired functionality and/or stability. For example, an application may be tested to ensure that the application launches functions correctly on command, is free of bugs (e.g., errors or other defects), etc. Testing of an application may be performed by developers during the development of an application, by a third party prior to the release of an application or when an application is updated.

Application testing may be performed using manual or automated testing models. In some application development models, an independent group of testers may manually test the application after functionality of the software application is developed, but prior to the application being provided to customers. In automated testing, the application may be tested using a test suite that includes a set of test scripts (i.e., a set of testing instructions) or test instructions. The test suite may be performed on the application to determine whether the application functions as expected. Regression testing is a type of application testing that may be performed manually or autonomously. In regression testing, an updated version of an application may be retested to ensure that more recent software bugs (or regressions) were not introduced when updating the application.

DETAILED DESCRIPTION

Figure 1A:
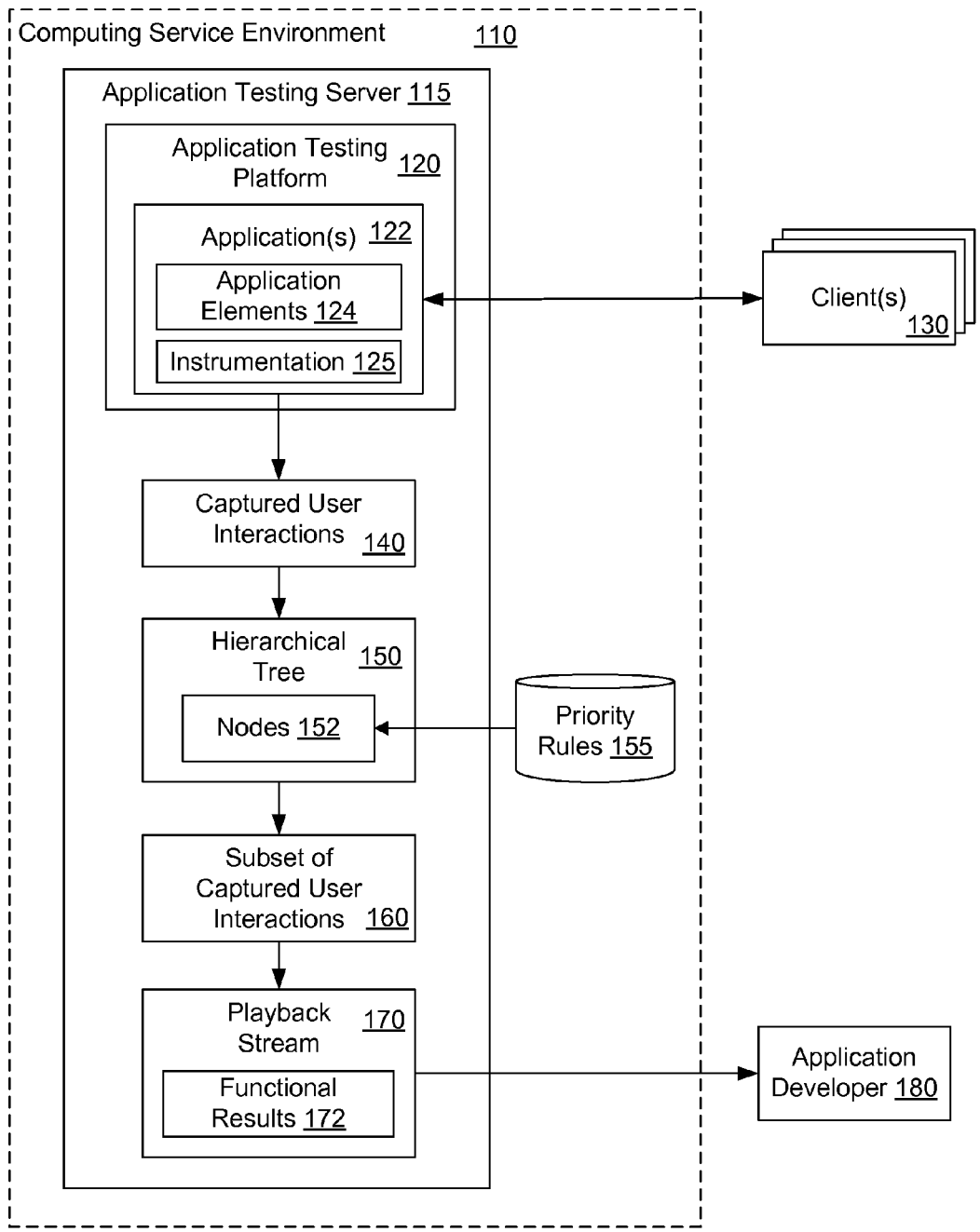
FIG. 1A illustrates a system and related operations for testing an application using user interactions captured on an application testing platform according to an example of the present technology.

A technology is described for testing an application in an autonomous manner. The application may be regression tested by utilizing captured user interactions associated with the application. The captured user interactions may be used to create a playback stream. The playback stream of the captured user interactions may be aggregated and modified in order to be used to automatically test the functionality of the application.

In one example, a plurality of user interactions may be captured when application elements of the application are being interacted with by a group of users. The users may be able to download and/or explore the application prior to purchase for trial period, such as a time-limited period or during a session in which the application is provided in an emulated, virtualized, or simulated environment. In one configuration, the application may be running on a computing service environment when the users are interacting with the application during the trial period. For example, the application may be virtualized or run in the computing service environment and streamed to the user's device, such as to a web browser accessing a web page, where the user can interact with the application as if it had purchased and downloaded to the user's device. In such scenarios, the application can be simulated or emulated, thereby allowing the user to interact with the application without downloading the application to the user's device. The computing service environment may facilitate capture of the user interactions when the application is being explored during the time limited trial period. For example, user interactions with certain application elements of the application (e.g., screens, pages, levels, zones, states, virtual worlds, etc.) during the time limited trial period may be captured via the computing service environment. The user interactions may indicate clicks, swipes, gestures, menu selections, text input, button selections, icon selections, mouse movements, etc., with respect to the application elements in the application.

In an alternative configuration, the application may be downloaded to a client device and the user may explore the application on the client device. For example, the user may be able to interact with the application over a limited period of time (e.g., two days). The user interactions performed by the user while the application is being interacted with may be captured or recorded by the client device. The client device may send the captured user interactions to the computing service environment. After the limited period of time has expired, the user may be unable to use the application unless the application is purchased at an online application store.

A plurality of captured user interactions from multiple users during a period (e.g., a trial period) for using the application may be used to generate a hierarchical tree. The hierarchical tree may include nodes to represent the application elements of the application that are interacted with during the time limited trial period. The hierarchical tree may include nodes that are connected to other nodes, which may correspond to application elements (e.g., buttons, menu items, drop downs, sliders, radio buttons, screens, etc.) that are used to perform functions or navigate to other application elements within the application. Each node may be associated with a number of captured user interactions (or a certain density). For example, a first node in the hierarchical tree may be associated with 100 captured user interactions (e.g., 100 clicks on a specific button), whereas a second node may be associated with a just a few captured user interactions for a specific settings radio button.

Nodes in the hierarchical tree that are selected for playback in testing (e.g., regression testing) may be prioritized based on a defined priority order. For example, nodes indicating application elements with likely failures or errors based on the captured user interactions may be prioritized more than nodes for which the number of captured user interactions exceeds a defined use threshold (e.g., nodes that represent popular application elements). The nodes for which the number of captured user interactions exceeds the defined use threshold may be more prioritized than nodes for which the number of captured user interactions is below the defined use threshold (e.g., nodes that represent unpopular or less traversed application elements). In addition, the popular nodes may be more prioritized than nodes with increased depth within the hierarchical tree. In other words, nodes that have relatively deep traversal in the hierarchical tree may be less prioritized than the popular nodes. The other nodes in the hierarchical tree may be less prioritized than the nodes with potential failures, the popular nodes, and the nodes that are deeper in the hierarchical tree. Over a period of time, certain nodes in the hierarchical tree may become less prioritized or more prioritized depending on changes in the number of captured user interactions for the nodes. In one example, certain nodes in the hierarchical tree may be manually selected as having an increased priority level.

A subset of captured user interactions may be identified for the selected nodes. In other words, the subset of captured user interactions may be associated with the nodes that are selected from the hierarchical tree using the defined priority order. In one example, the subset of captured user interactions may also be associated with nodes that are manually indicated as having an increased priority level. The subset may include captured user interactions that are substantially distinct from each other, and duplicative or highly similar user interactions can be consolidated into a limited number of user actions in testing. As an example, from a group of five similar captured user interactions for a prioritized node, a single captured user interaction may be selected for inclusion in the subset in order to reduce redundancy in testing. Therefore, the filtered user interactions included in the subset may correspond to user actions for the highly prioritized nodes in the hierarchical tree. In addition, the subset may include filtered user interactions for less prioritized nodes and the filtered user interactions for the less prioritized nodes may be used for testing depending on the availability of application testing resources.

The subset of captured user interactions may be provided for playback in the computing service environment in order to verify a functionality of the application. A playback period for the subset of captured user interactions may conform to a defined testing time period (e.g., 15 or 20 minutes). The defined testing time period may be selected based on an application category or a popularity level of the application at an online application store. An increased defined testing time period (i.e., an increased playback period) may lead to an increased number of nodes being selected from the hierarchical tree. In addition to increasing the number of nodes, an increased number of captured user interactions may be included in the subset, thereby resulting in a more in-depth test of the application. In other words, the subset may include user interactions for less prioritized nodes, as well as the most prioritized nodes. Therefore, the application testing may be performed to strategically cover a number of distinct application elements in the application that are able to be tested within the defined testing time period.

In one configuration, additional user interactions with application elements may be captured for an updated version of the application. For example, an application developer may add additional features (e.g., additional application elements) when developing the updated version of the application. The hierarchical tree may be modified to include nodes that represent the application elements of the updated version of the application. In one example, nodes may be added or removed from the hierarchical tree when the application elements associated with the nodes are added or removed from the updated version of the application, respectively. Nodes may be reselected from the hierarchical tree in accordance with the defined priority order. The subset of captured user interactions may be modified to include captured user interactions for the reselected nodes. The subset of captured user interactions may be provided for playback in order to verify the functionality of the updated version of the application.

The applications that are regression tested may be offered for sale at an online application store. The online application store may offer many applications for sale for mobile devices, tablet computers, laptop computers, smart watches, etc. The applications may be in a wide range of categories, such as games, sports, news, photo sharing, music sharing, education, travel, weather, books, etc. As the number of applications available for sale in the online application store increases, manual testing of the applications before the applications are allowed to be sold in the online store may become increasingly cumbersome. Therefore, the technology described herein relates to automatically testing (e.g., via regression testing) the functionality and operations of the applications.

FIG. 1A illustrates an exemplary system and related operations for testing applications 122 using captured user interactions 140 that are captured via an application testing platform 120. The application testing platform 120 may operate on an application testing server 115. An application 122 may be interacted with via the application testing platform 120 that operates in a computing service environment 110. For example, a client 130 may interact with application elements 124 of the application 122 for a time limited trial period (e.g., 2 days). The client 130 may interact with the application elements 124 via a web browser that is being executed on a hardware device. For example, the application 122 may be virtualized or run in the computing service environment 110 and streamed to the user's device, such as to a web browser accessing a web page, where the user can interact with the application 122 as if it had purchased and downloaded to the user's device. The application elements 124 may include screens, pages, menus, buttons, dropdowns, text entries, etc. The application testing platform 120 may facilitate a capture or recording of user interactions using instrumentation 125 in the application 122 while the client 130 is interacting with the application 122. The captured user interactions 140 may demonstrate users performing actions within the application elements 124 and/or navigating between application elements 124 via application navigation elements (e.g., buttons, menus).

The application testing server 115 may use the captured user interactions 140 to generate a hierarchical tree 150. The hierarchical tree 150 may have nodes 152 representing the application elements 124 that are interacted with during the time limited trial period and what those interactions are. The nodes 152 included in the hierarchical tree 150 may each be associated with a number of captured user interactions 140. For example, in a "Settings" window of an application, an "Apply" button may collect multiple clicks from user interactions but only one of those clicks may need to be played back for each variation of settings in the "Settings" window.

In one configuration, the nodes 152 that are used in testing (e.g., regression testing) may be selected from the hierarchical tree 150 based on priority rules 155. In one example, the priority rules 155 may indicate that nodes 152 representing application elements 124 with potential failures are prioritized higher than nodes 152 for which the number of captured user interactions 140 exceeds a defined threshold (e.g., popular nodes). In addition, the nodes 152 that are deemed popular may be prioritized higher than nodes 152 with an increased depth in the hierarchical tree 150. Therefore, nodes 152 with a higher priority compared to other nodes 152 may be selected from the hierarchical tree 150 to be tested before lower priority nodes in accordance with the priority rules 155.

The application testing server 115 may identify a subset of captured user interactions 160 from the captured user interactions 140 using the priorities discussed earlier. The subset of captured user interactions 160 may be associated with the prioritized nodes 152 from the hierarchical tree 150. The subset 160 may exclude captured user interactions that are not substantially distinct from other captured user interactions in the subset 160 in order to reduce redundancy and save resources. The application testing server 115 may use the subset of captured user interactions 160 to generate a playback stream 170. The subset of captured user interactions 160 in the playback stream 170 may be played back in order to verify a functionality of the application 122. In some cases, the testing time may be limited for the applications due to the large number of applications (e.g., hundreds or thousands) that may be tested and just fifteen to thirty minutes may be allocated for a test run. So, the playback stream 170 may be executed or applied against the application until a defined time period has expired. As a result the entire playback stream 170, may not be executed but the more important parts of the playback stream 170 will play back due to the applied prioritization. In case additional time is available during the test run, then the subset of captured user interactions 160 used for regression testing may include captured user interactions 140 for less prioritized nodes 152.

In one further example, functional results 172 indicating whether or not the application elements 124 of the application 122 function correctly may be generated. The functional results 172 may be provided to an application developer 180 or a third party testing the application (e.g., for presentation in an app store).

As a non-limiting example, the application 122 may be an email application with five separate screens (i.e., five application elements 124). The screens may be represented as A, B, C, D and E. The client 130 may interact with the email application via the application testing platform 120, and over a period of time, 50 user interactions may be captured or recorded for the email application. For example, the application 122 may be virtualized or run in the computing service environment 110 and streamed to the user's device, such as to a web browser accessing a web page, where the user can interact with the application 122 as if it had purchased and downloaded to the user's device. A hierarchical tree 150 may be generated with five nodes 152 (e.g., A, B, C, D and E) to represent the five screens, respectively. The hierarchical tree 150 may indicate a relative density of user interactions captured for each of the nodes 152. For example, if a majority of the 50 user interactions are associated with screen A, then node A may be more dense than the other four nodes 152 (i.e., B, C, D and E). In one example, the captured user interactions 140 may indicate that screen E has potential failures and screen A is the most popular out of the five screens in the application. Therefore, nodes E and A may be selected for testing first based on the priority rules 155. A subset of the 50 user interactions may be identified for nodes E and A. In other words, not all 50 user interactions may be used to create the playback stream 170 because some interactions will be duplicates or quite similar interactions, but rather a subset of distinct user interactions for the highest priority nodes 152 (i.e., nodes E and A) may be used to create the playback stream 170. In one example, out of the 50 total captured user interactions, 30 captured user interactions may pertain to nodes E and A, of which 10 captured user interactions are prioritized in the playback stream. Therefore, the playback stream may start with the 10 captured user interactions for automatically testing the functionality of the email application. If time allows, the testing may encompass the other captured user interaction that were not priority interactions.

Figure 1B:
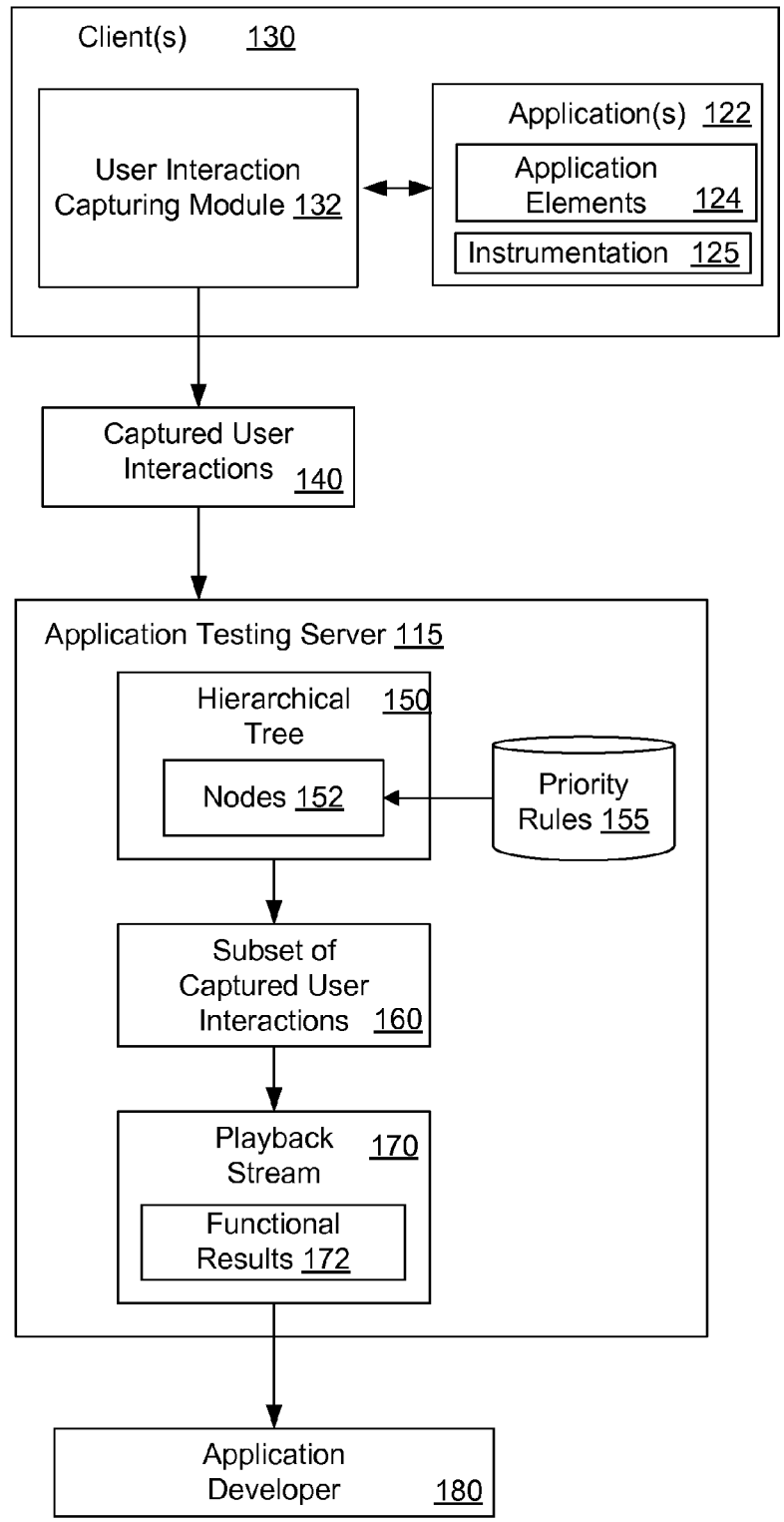
FIG. 1B illustrates a system and related operations for testing an application using user interactions captured on a client device according to an example of the present technology.

FIG. 1B illustrates an exemplary system and related operations for testing an application 122 using captured user interactions 140 from a client 130. The client 130 may download the application 122 from an online application store. A user of the client 130 may interact with application elements 124 of the application 122 (e.g., screens, pages, menus, or buttons) for a time limited trial period. A user interaction capturing module 132 on the client 130 may capture the user interactions via instrumentation 125 in the application 122 while the user interacts with the application 122. Instrumentation is additional code that is added to the application to capture the user interactions and send them to the user interaction capturing module 132 to be stored or transmitted across a network. Alternatively, as described herein, the application 122 may be virtualized or run in the computing service environment 110 and streamed to the user's device, such as to a web browser accessing a web page, where the user can interact with the application 122 as if it had purchased and downloaded to the user's device.

The user interaction capturing module 132 may send the captured user interactions 140 to an application testing server 115. The application testing server 115 may generate a hierarchical tree 150 having nodes 152 using the captured user interactions 140. The nodes 152 may represent the application elements 124 that are interacted with during the time limited trial period and what those interactions are. The nodes 152 may be prioritized based on priority rules 155. The application testing server 115 may identify a subset of captured user interactions 160 for the prioritized nodes 152. The application testing server 115 may use the subset of captured user interactions 160 to generate a playback stream 170. Based on the playback stream 170, functional results 172 indicating a functionality of the application 122 may be generated and provided to an application developer 180.

Figure 2:
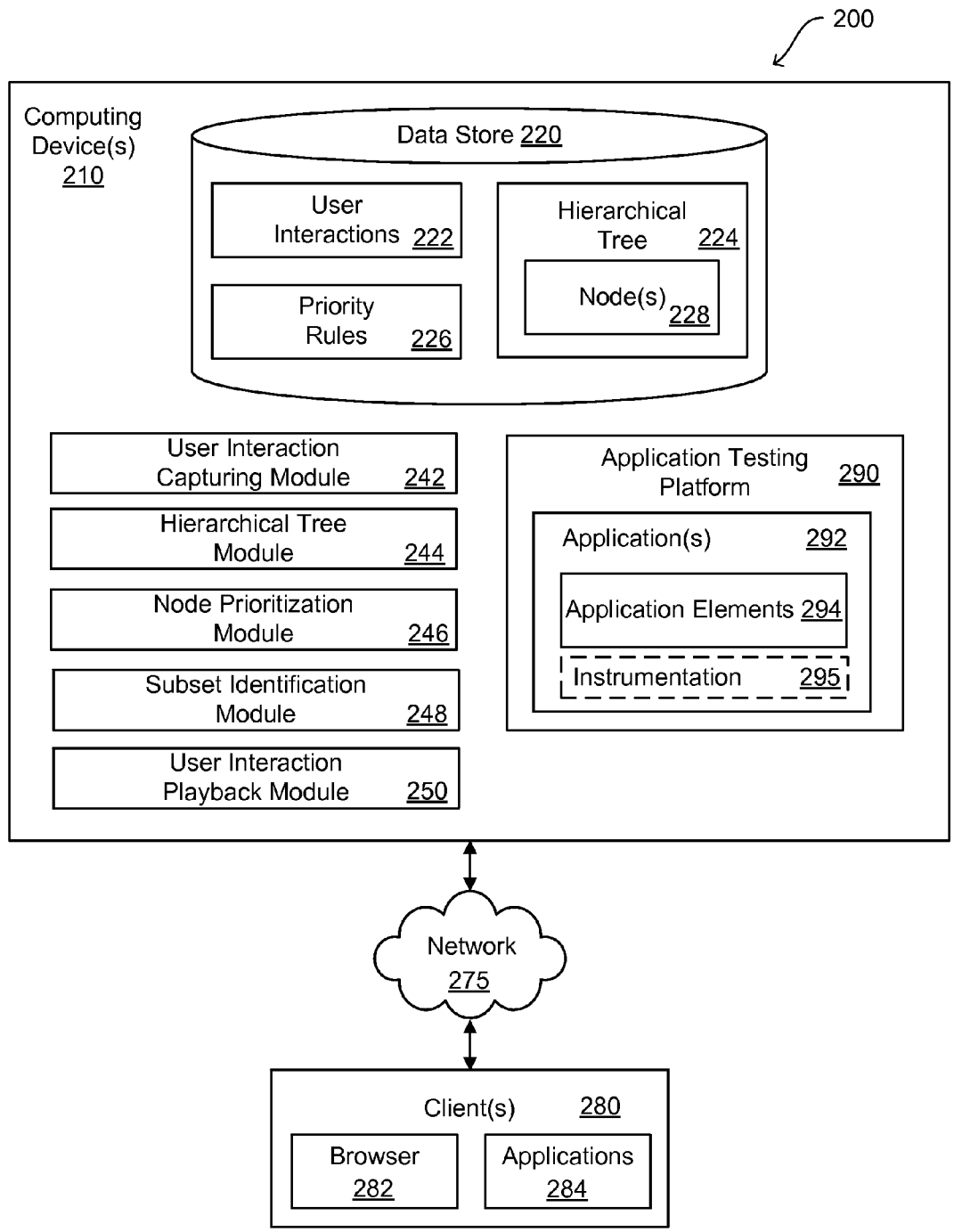
FIG. 2 is an illustration of a networked system for regression testing of an application according to an example of the present technology.

In the following discussion, a general description of an example system and associated components for regression testing of an application are provided. The general description is followed by a discussion of the operation of the components in a system for the technology. FIG. 2 illustrates a networked environment 200 according to one example of the present technology. The networked environment 200 may include one or more computing devices 210 in data communication with a client 280 by way of a network 275. The network 275 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 210 according to varying configurations. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The data stored in the data store 220, for example, may be associated with the operation of the various applications and/or functional entities described below.

The data stored in the data store 220 may include user interactions 222, and the user interactions 222 may be related to applications 292 that are executed via an application testing platform 290. The user interactions 222 may be captured or recorded using instrumentation 295 in the applications 292 when the applications 292 are being interacted with via the application testing platform 290. The instrumentation 295 may be turned off when the application testing platform 290 is being used to playback the user interactions 222 as opposed to capturing the user interactions 222. The user interactions 222 may include interaction with various application elements 294 within the applications 292. Non-limiting examples of application elements 294 may include screens, pages, buttons, menus, text entry, search interfaces, radio buttons, data entry, etc. As an example, the user interactions 222 data store may indicate that there have been 1000 user interactions for a first application element in application Z, 500 user interactions for a second application element in application Z, and 50 user interactions for a third application element in application Z. The user interactions 222 data may represent actions performed with respect to the application elements 294 in the application (e.g., clicks, swipes, gestures, menu selections, text input, button selections, icon selections, etc.). In other words, the user interactions 222 may be related to certain application navigation elements (e.g., menus, buttons, icons, windows, etc.) that were interacted with by a user in the application 292. In one example, the user interactions 222 may include 500 separate user interactions of multiple users selecting an icon in state A in order to transition to state B. Other non-limiting examples of user interactions 222 may include user actions for setting application options, performing a query, interacting with other users, entering data, etc.

The data stored in the data store 220 may include a hierarchical tree 224 for each application. The hierarchical tree 224 may have a plurality of nodes 228 that represent the application elements 294 of an application 292. Each application 292 may be associated with a distinct hierarchical tree 224, and each node 228 may be associated with a relative density value based on a number of user interactions 222 associated with the application element 294 for the node 228. Nodes 228 that are associated with an increased number of user interactions 222 may be associated with an increased density, and nodes with reduced user interactions 222 may have a lower density. A first node 228 may be connected to a second node 228 in the hierarchical tree 224 when the application element 294 associated with the first node 228 may be navigated to activated from the application element 294 associated with the second node 228. In one configuration, the nodes 228 in the hierarchical tree and their respective densities may dynamically vary based on the user interactions 222. For example, when the user interactions 222 indicate that certain application elements 294 have become less popular or have been removed from the application 292, the corresponding nodes 228 in the hierarchical tree 224 may be modified accordingly.

The data stored in the data store 220 may include priority rules 226. The priority rules 226 may facilitate the prioritization of certain nodes 228 in the hierarchical tree 224 in order to generate a prioritized playback stream for automatic testing of the application 292. In one example, the priority rules 226 may indicate that nodes 228 in the hierarchical tree 224 representing application elements 294 with potential failures may be prioritized higher than nodes 228 in the hierarchical tree 224 for which the number of user interactions 222 exceeds a defined threshold or have an increased density. In other words, the priority rules 226 may indicate that nodes 228 with potential errors may be prioritized higher than popular nodes 228. In another example, the priority rules 226 may indicate that nodes 228 in the hierarchical tree 224 for which the number of user interactions 222 exceeds a defined threshold may be prioritized higher than nodes 228 for which the number of user interactions 222 is below the defined threshold. In other words, the priority rules 226 may indicate that popular nodes 228 may be prioritized higher than nodes 228 that represent unpopular or less traversed application elements 294. In addition, the popular nodes 228 may be more prioritized than nodes 228 with a greater depth within the hierarchical tree 224. In other words, nodes 228 that are relatively deep in the hierarchical tree 224 may be less prioritized than the popular nodes 228.

In one configuration, the priority rules 226 may incorporate aging and prioritize nodes 228 that are associated with more recent user interactions 222 (e.g., two days old), as opposed to nodes 228 that are associated with less recent user interactions 222 (e.g., two weeks old). The prioritization of nodes 228 based on date may be useful when updated versions of the application are released and application elements 294 that previously received user interaction 222 no longer receive user interactions 222. Therefore, the nodes 228 corresponding to these application elements 294 (i.e., with less recent user interactions 222) may be reduced in priority based on the priority rules 226.

The components executed on the computing device 210 may include a user interaction capturing module 242, a hierarchical tree module 244, a node prioritization module 246, a subset identification module 248, a user interaction playback module 250, and other applications, services, processes, systems, engines, or functionality not discussed in detail herein. The user interaction capturing module 242 may be configured to capture the user interactions 222 with the application 292. For example, the user interaction capturing module 242 may capture the user interactions 222 when application elements 294 of the application 292 are being interacted with during a time limited trial period offered for using the application 292. For example, the application 292 may be explored prior to purchase via the application testing platform 290. The user interaction capturing module 242 may capture the user interactions 222 from a group of users that are exploring the application via the client 280. In one example, the user interaction capturing module 242 may receive communications from instrumentation in the applications 292 to capture a log of application elements 294 interacted with during the time limited trial period, as well as a set of coordinates for user clicks performed with the application elements 294 during the time limited trial period.

The hierarchical tree module 244 may be configured to generate a hierarchical tree 224 having nodes 228 to represent the application elements 294 of the application 292. The nodes 228 may correspond to the application elements 294 that are interacted with during the time limited trial period. The hierarchical tree module 244 may generate the hierarchical tree 224 such that each node 228 is connected to at least one other node 228. In addition, the hierarchical tree module 244 may generate the hierarchical tree 224 such that each node 228 is associated with a certain density representing a volume of user interactions. The density of the node 228 may be determined based on a number of user interactions 222 associated with the node 228. In one configuration, the hierarchical tree module 244 may update the hierarchical tree 224 over a period of time as the user interactions 222 fluctuate with respect to certain nodes 228 in the hierarchical tree 224. For example, the hierarchical tree module 244 may add or remove nodes 228 in the hierarchical tree 224, as well as change the densities, based on the user interactions 222.

The node prioritization module 246 may be configured to prioritize nodes 228 from the hierarchical tree 224 using the priority rules 226. In one example, the node prioritization module 246 may prioritize nodes 228 that indicate application elements 294 with potential failures according to a first priority level. The node prioritization module 246 may prioritize nodes 228 indicating application elements 294 for which the number of user interactions 222 exceeds a defined threshold according to a second priority level (e.g., popular application elements 294). The node prioritization module 246 may not prioritize nodes 228 indicating application elements 294 for which the number of user interactions 222 are below the defined threshold (e.g., unpopular or less traversed application elements 294). The node prioritization module 246 can also prioritize nodes 228 based on depth of the nodes 228 in the hierarchical tree 224 according to a third priority level. In other words, the nodes 228 that are relatively deep in the hierarchical tree 224 (but do not contain failures and are not popular) may be prioritized according to the third priority level. The remaining nodes 228 in the hierarchical tree 224 (i.e., the nodes 224 that do not indicate failures, are not popular, and are not particularly deep in the hierarchical tree 224) may be prioritized according to the fourth priority level or may simply not be prioritized. In one configuration, the node prioritization module 246 may be limited to selecting a defined number of nodes 228 based on a defined testing time period for testing the application 292.

The subset identification module 248 may be configured to identify a subset of user interactions 222 associated with the nodes 228 that are most prioritized in the hierarchical tree 224 using the priority rules 226. In some cases, the subset identification module 248 may identify the subset to include user interactions 222 for nodes 228 that are less prioritized. The subset identification module 248 may identify user interactions 222 for each selected node 228 that are substantially distinct from other user interactions 222 for the same node 228. As a non-limiting example, 50 separate user interactions 222 may essentially show the same functionality performed in a particular virtual scene of the application 292. Therefore, rather than using the 50 identical or similar user interactions 222, the subset identification module 248 may extract a single user interaction 222 for inclusion in the subset of user interactions 222. In one example, the subset identification module 248 may create the subset of user interactions 222 to include non-overlapping user interactions 222 from the most prioritized nodes 228 in the application 292. In one configuration, the subset identification module 248 may be limited to selecting a defined number of user interactions 222 for inclusion in the subset based on the defined testing time period for testing the application 292.

The user interaction playback module 250 may be configured to provide the subset of user interactions 222 for the prioritized nodes 228 for playback in order to verify a functionality of the application 292. The user interaction playback module 250 may play back recorded user interactions 222 that correspond to the most prioritized nodes 228 in the application 292 (and possibly less prioritized nodes if testing time is available). By performing the subset of user interactions 222 during playback, the functionality for the corresponding application elements 294 may be verified via automated testing. In one example, the user interaction playback module 250 may play back the subset of user interactions 222 in accordance with the defined testing time period. For example, the defined testing time period may be set based on an application category in an application classification system or an online application store or a popularity level of the application 292 at the online application store. In general, the user interaction playback module 250 may facilitate a more thorough test of the application 292 when the defined testing time period is increased due to the increased number of nodes 228 and/or user interactions 222 that can be analyzed during the playback.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a clustered computing resource, virtualization server, a grid computing resource, and/or any other distributed computing arrangement. Such computing devices 210 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The client 280 may be representative of a plurality of client that may be coupled to the network 275. The client 280 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, tablet computer systems, game consoles, electronic book readers, or other devices with like capability.

The client 280 may be configured to execute various applications such as a browser 282, and/or other applications 284. The applications 284 may correspond to code that is executed in the browser 282 (e.g., web applications). For example, the client 280 may interact with applications 292 on an application testing platform 290 via the browser 282 and/or other applications 284.

The client device 280 may include or be coupled to display device. The browser 282 may be executed on the client device 280, for example, to access and render network pages (e.g. web pages) or other network content served up by the computing device 210 and/or other servers. The display device may comprise, for example, one or more devices such as cathode ray tubes (CRTs), liquid crystal display (LCD) screens, gas plasma-based flat panel displays, LCD projectors, or other types of display devices, etc. In addition, the display device may include an audio device, tactile device (e.g., braille machine) or another output device to feedback to a customer.

The application testing platform 290 may enable limited user interaction with a plurality of applications 292. In one example, users can interact with an application 292 via the client 280 during a limited trial period offered for using the application prior to purchase. The application testing platform 290 may operate in conjunction with the computing device 210 for capturing and recording the user interactions 222 while the users are interacting with the applications 292. The applications 292 may include various application elements 294, such as screens, pages, levels, etc. For example, the application may be virtualized or run in the computing service environment and streamed to the user's device, such as to a web browser accessing a web page for trying out the application for a limited time, where the user can interact with the application as if it had purchased and downloaded to the user's device. In such scenarios, the application can be simulated or emulated, thereby allowing the user to interact with the application without downloading the application to the user's device.

Figure 3:
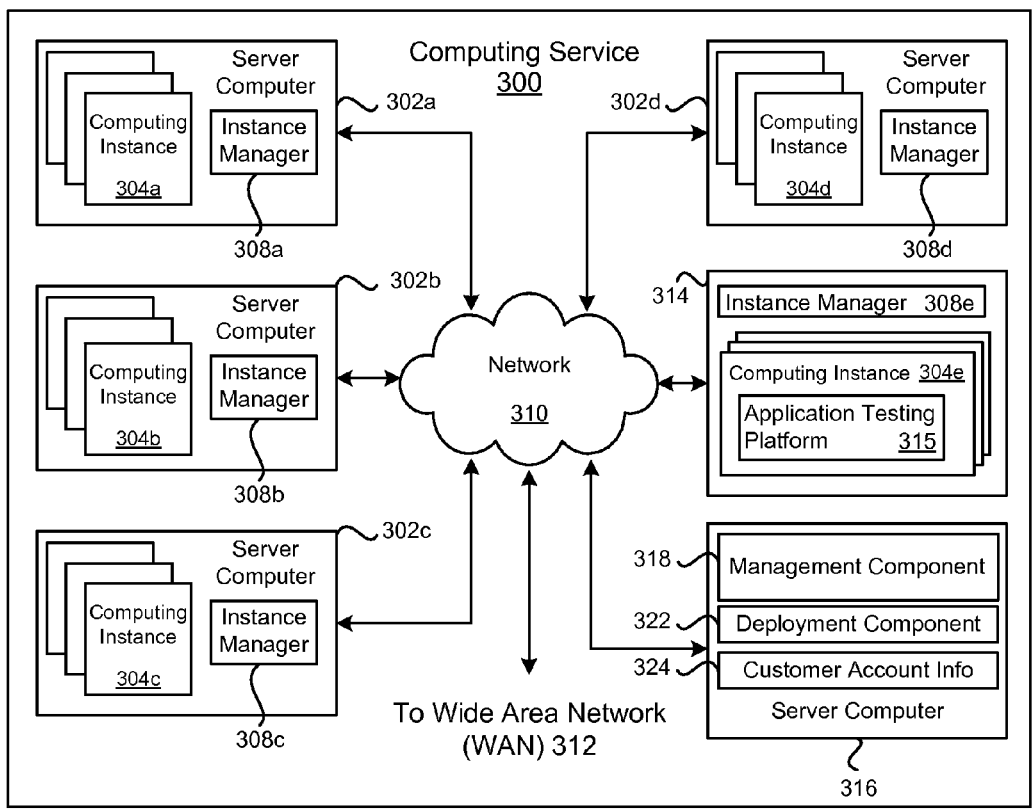
FIG. 3 is a block diagram of a computing service environment according to an example of the present technology.

FIG. 3 is a block diagram illustrating an example computing service 300 that may be used to execute and manage a number of computing instances 304a-e upon which the present technology may execute. In particular, the computing service 300 depicted illustrates one environment in which the technology described herein may be used. The computing service 300 may be one type of environment that includes various virtualized service resources that may be used, for instance, to host computing instances 304a-e.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-e. Computing instances 304a-e may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-e capable of executing the instances. The instance manager 308a-e may be a hypervisor, virtual machine monitor (VMM), or another type of program configured to enable the execution of multiple computing instances 304a-e on a single server. Additionally, each of the computing instances 304a-e may be configured to execute one or more applications.

One or more server computers 314 and 316 may be reserved to execute software components for managing the operation of the computing service 300 and the computing instances 304a-e. For example, the server computer 314 may execute an application testing platform 315. The application testing platform 315 may execute applications for a time limited trial period in which users may interact with the application. The application testing platform 315 may execute applications in order to regression test the applications that are available for sale at an online application store. In addition, the application testing platform 315 may facilitate capture of the user interactions while the application is interacted with by the user.

A server computer 316 may execute a management component 318. A customer may access the management component 318 to configure various aspects of the operation of the computing instances 304a-e purchased by a customer. For example, the customer may setup computing instances 304a-e and make changes to the configuration of the computing instances 304a-e.

A deployment component 322 may be used to assist customers in the deployment of computing instances 304a-e. The deployment component 322 may have access to account information associated with the computing instances 304a-e, such as the name of an owner of the account, credit card information, country of the owner, etc. The deployment component 322 may receive a configuration from a customer that includes data describing how computing instances 304a-e may be configured. For example, the configuration may include an operating system, provide one or more applications to be installed in computing instances 304a-e, provide scripts and/or other types of code to be executed for configuring computing instances 304a-e, provide cache logic specifying how an application cache should be prepared, and other types of information. The deployment component 322 may utilize the customer-provided configuration and cache logic to configure, prime, and launch computing instances 304a-e. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302a-d. The network topology illustrated in FIG. 3 has been simplified, as many more networks and networking devices may be utilized to interconnect the various computing systems disclosed herein.

Figure 4:
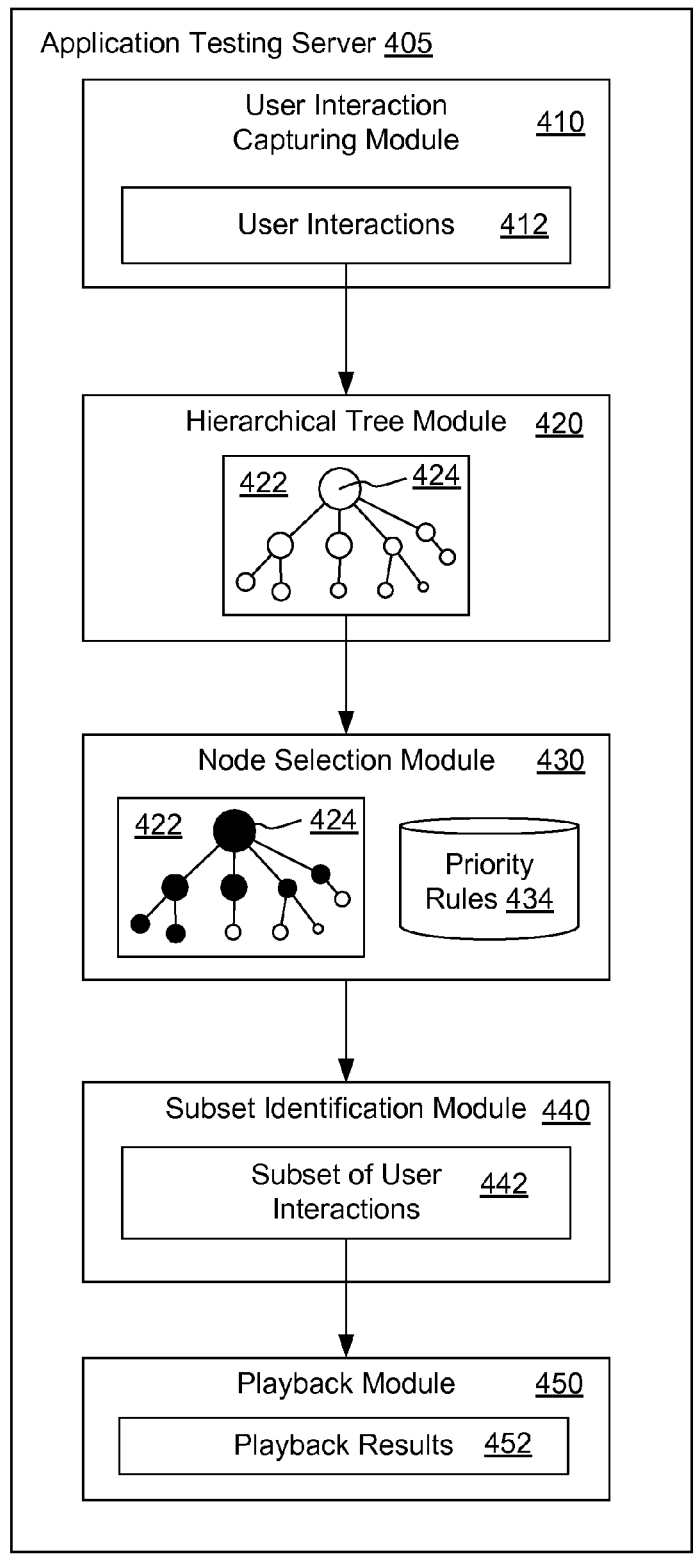
FIG. 4 illustrates a system and related operations for regression testing of an application using a hierarchical tree having nodes to represent application elements of the application according to an example of the present technology.

FIG. 4 illustrates an exemplary system and related operations for regression testing of an application using a hierarchical tree 422 having nodes 424 to represent application elements of the application. The application may be regression tested using an application testing server 405. The nodes 424 may be associated with user interactions that are captured when users interact with the application elements. The most relevant nodes 424 in the hierarchical tree 422 may be identified using a set of priority rules 434. Selected user interactions 412 associated with the most relevant nodes 424 may be assembled and used to create a playback stream. Since the playback stream may capture distinct and valuable functionalities of the application, the playback stream may be analyzed to test the functionality of the application.

The application may be offered for sale at an online application store. The online application store may offer many applications for sale for mobile devices, tablet computers, laptop computers, smart watches, etc. The applications may be in a wide range of categories, such as games, sports, news, photo sharing, music sharing, education, travel, weather, books, etc. As the number of applications available for sale in the online application store increases, manual testing of the applications before the applications are allowed to be sold in the online store may become increasingly cumbersome. Therefore, the technology described herein relates to automatically testing (e.g., via regression testing) the functionality and operations of the applications.

In one example, an application available for purchase at the online application store may be used during a trial period. The trial period may enable users to interact with the application for a limited duration during the trial period. For example, users may be provided with 30 minutes or 2 days to explore the application free of charge. The users may interact with the application that has been downloaded to a client device or an application located on a remote server that can be interacted with from a client device. Users who find the application valuable based on the trial period may be able to later purchase the application at the application store. When the application is being interacted with during the trial period, the application may run on the client device or an application testing platform in a computing service environment. In the case where the application is executing on a client device, the application may be instrumented to enable the user interactions to be recorded (e.g., in a log or as individual events) and be sent to a central collection point. In the case of the application executing on the application testing platform, the application to be run on the application testing platform for the limited duration, and after the limited duration has expired, the user may be prompted to purchase the application at the online application store. In other examples, the user may be provided with recommendations for similar applications, a feedback survey, reviews for the application, additional information about the application, etc.

In one configuration, a user interaction capturing module 410 on the application testing server 405 may capture or record user interactions 412 while the application is being interacted with during the trial period. Since users are likely to check the core functionality of the application during the trial period, these user actions may be utilized for automated testing of the application. For a given application, the user interaction capturing module 410 may capture user interactions 412 from a plurality of users interacting with the application. The user interaction capturing module 410 may continually capture the user interactions 412 with the application, or alternatively, the user interaction capturing module 410 may capture the user interactions 412 for a limited period (e.g., two weeks) at which time the user interactions 412 may cease to be captured, even when the application may continue to be available for time limited trial periods.

The user interaction capturing module 410 may capture the user interactions 412 with the application elements of the application. The application elements may include particular screens, pages, zones, states, user interfaces, etc. of the application. The user interactions 412 may include, but are not limited to, clicks, gestures, swipes, scrolling, selections, text inputs, joystick inputs, etc. with respect to the application elements of the application. In addition, the user interactions 412 may include interaction with various navigation elements in the application, such as menus, buttons, icons, data entry fields, windows, etc. Other examples of the user interactions 412 may include launching the application, shutting down the application, communicating with other users using the application, etc. The user interactions 412 may be captured or recorded throughout a user's time limited interaction with the application via the application testing platform. In one example, the user interaction capturing module 410 may capture the user interactions 412 directly via the application testing platform, or alternatively, the client device may capture the user interactions 412 and send the user interactions 412 to the user interaction capturing module 410.

As a non-limiting example, an image sharing application may be interacted with by a group of users for the time limited trial period. The image sharing application may have a home page of screen A. A first user may interact with screen A, and then click on a first button to access screen B. A second user may interact with screen A, and then click on a second button to access screen C. A third user may perform actions on screen A to complete an event, which thereby transitions the application to screen D. In other examples, the users may each interact with multiple screens. The user interactions between the multiple users may be merged together. In one example, of the 10 total users who interact with the image sharing application, ten user interactions may be with screen A (i.e., the home page), six user interactions may be with screen B, four user interactions may be with screen C, and three user interactions may be with screen D. Therefore, the user interaction capturing module 410 may capture distinct and/or overlapping user interactions 412 from multiple users interacting with the application in different or same ways. While some users may interact with certain application elements in similar manners, other users may interact differently (e.g., in terms of which buttons are selected, or which events are performed within a particular application element).

A hierarchical tree module 420 on the application testing server 405 may generate the hierarchical tree 422 having nodes 424 to represent the application elements of the application that are interacted with during the time limited trial period. The hierarchical tree 422 may represent the plurality of user interactions 412 that are captured for the application. For example, each node 424 in the hierarchical tree 422 may be associated with a number of user interactions 412. As a non-limiting example, the number of user interactions 412 for a particular node 424 may range from a single interaction to thousands of user interactions 412. The hierarchical tree module 420 may assign a density to each node 424 based on the number of user interactions 412 associated with the node 424. For example, nodes 424 that are associated with a relatively large number of user interactions 412 may have densities that are greater than nodes 424 that are associated with a relatively small number of user interactions 412. The hierarchical tree module 420 may constantly modify the hierarchical tree 422 over time as more recent user interactions 412 for a particular application element are captured. Therefore, certain nodes 424 of the hierarchical tree 422 may increase in density or decrease in density. In addition, certain nodes 424 of the hierarchical tree 422 may be added or deleted, for example, when an updated version of the application is released.

The hierarchical tree 422 managed by the hierarchical tree module 420 may include a first node associated with screen A. The first node may branch out to a second node, a third node and a fourth node. In this example, the second node, the third node and the fourth node are not connected directly to each other, but each connected directly to the first node. The second node may correspond to screen B, the third node may correspond to screen C, and the fourth node may correspond to screen D. Each of the four nodes may be associated with a number of user interactions 412. For example, the first node may be associated with 100 user interactions, the second node may be associated with 80 user interactions, the third node may be associated with 50 user interactions, and the fourth node may be associated with 20 user interactions. In one example, a user may navigate through the application, such that multiple screens are interacted with, even when there is no direct link between the screens. For example, a user may interact with screen A, click on a button to access screen B, go back to screen A, and then click on a button to access screen C.

A node selection module 430 on the application testing server 405 may select nodes 424 from the hierarchical tree 422 based on the priority rules 434. As shown in FIG. 4, the nodes 424 that are shaded may represent the nodes 424 with an increased priority level as compared to the other nodes 424, and are thus selected by the node selection module 430. In one example, the node selection module 430 may select nodes 424 indicating application elements with potential failures according to a first priority level. The node selection module 430 may select nodes 424 indicating application elements for which the number of user interactions 412 exceeds a defined threshold according to a second priority level. The node selection module 430 may select nodes 424 indicating application elements based on a depth of the nodes 424 in the hierarchical tree 422 according to a third priority level. Therefore, the depth of a node in the hierarchical tree 422 with respect to the application elements may be the third priority level. In this configuration, nodes 424 that are denser may be prioritized higher than nodes 424 that are less dense.

In an alternative configuration, the node selection module 430 may implement a modified priority scheme to as described above (e.g., the most popular nodes are assigned a highest priority). In some cases, multiple nodes 424 that are associated with similar numbers of user interactions 412 may be prioritized equally. Over a period of time, certain nodes 424 may become less prioritized or more prioritized depending on changes to the number of user interactions 412 associated with the nodes 424 (i.e., the densities).

A subset identification module 440 on the application testing server 405 may identify a subset of user interactions 442 for the prioritized nodes 424 in the hierarchical tree 422. In other words, the subset of user interactions 412 may be associated with the nodes 424 that are selected based on the priority rules 434. The subset 442 may include user interactions 412 that are substantially distinct from other user interactions 412 in the subset in order to reduce redundancy. While user interactions 412 that effectively illustrate the same functionality may not repeated in the subset, as many distinct user interactions 412 as possible may be included in the subset with respect to a defined testing time period. Therefore, the user interactions 412 included in the subset 442 may correspond to the most prioritized nodes 424 and may include distinct user interactions 412 associated with those nodes 424. When multiple nodes 424 in the application are prioritized equally, then the subset identification module 440 may identify distinct user interactions 412 (e.g., distinct user actions) between the multiple nodes 424. In some cases, the user interactions 412 included in the subset 442 may be for less prioritized nodes 424 as well.

As a non-limiting example, the hierarchical tree 422 may include the four nodes (e.g., A, B, C and D) to represent the four screens of the application (e.g., A, B, C, D). Based on the priority rules 434, node C and node D may be assigned higher priority compared to node A and node B. A total number of user interactions 412 for the hierarchical tree 422 may be 100 user interactions, of which 70 user interactions are associated with node C and node D. The 70 user interactions may depict user actions performed with screens C and D. If a majority of the 70 user interactions depict the same user actions (e.g., navigating in screen C), then not all of these interactions may be selected. Rather, a single or a few user interactions that generally illustrate each particular user action may be selected for inclusion in the subset of user interactions 442.

A playback module 450 on the application testing server 405 may play back the subset of user interactions 442 associated with the most prioritized nodes 424 in order to verify a functionality of the application. By playing back the user interactions in the subset 442, the core functionality of the application may be automatically tested using regression testing. In other words, recorded user interactions may be replayed to determine the application's functionality. The recorded user interactions may also be referred to as a stream of clicks and/or events performed with the application elements. The user interactions included in the subset 442 may be strategically selected to cover the prioritized portions of the application and to provide the most in-depth coverage of the application. As a result, playback of the user interactions in the subset may generally include areas of the application with potential failures, areas of the application that are most popular, and in some cases, areas of the application with relatively deep traversal in the application.

The playback module 450 may generate playback results 452 based on the playback of the user interactions. The playback results 452 may indicate which application elements of the application function correctly and/or which application elements of the application do not function correctly. The playback results 452 may be provided to an application developer or a third party testing the application (e.g., for presentation in an app store).

In one example, a playback period for the subset of user interactions 442 may be limited to a defined testing time period. In other words, playback of the user interactions may not exceed the defined testing time period (e.g., 15 minutes or 20 minutes). In some examples, the defined testing time period may be selected based on an application category, a popularity level of the application at an online application store, an application developer's status level or experience level, available computing time for testing, etc. Therefore, popular applications may be provided with 60 minutes for playback and regression testing, whereas less popular applications may be provided with 10 minutes for playback and regression testing. In general, an increased testing time period may result in a more thorough testing of the application. The increased testing time period may result in an increased number of nodes 424 being selected from the hierarchical tree 422 and even nodes 424 with a reduced priority level may be selected. Based on how much time is available in the testing time period, user interactions 412 associated with less prioritized nodes 424 may be tested as well. In addition, the increased testing time period may enable an increased number of user interactions 412 to be tested. By playing back the increased number of user interactions 412 for an increased number of nodes 424, the application may be more thoroughly tested for functionality. In one example, the defined testing time period may result in a percentage of the application elements being tested. For example, an application may include 15 nodes but just five of the states may be tested due to the defined testing time period.

In one configuration, each of the applications that are available for purchase in the online application store may be tested via regression testing. 412 In other cases, certain applications in the online application store may be automatically tested via regression testing when a popularity level of the application at the electronic application store is above a defined interest level. In one example, a statistical model may be used to determine whether a particular application is expected to be popular, and if so, that application may be tested using an automated form of regression testing.

A notification or report may be provided to an application developer that indicates the application's tested functionality. The report may indicate which application elements of the application are functional and which application elements of the application are not functional. The application developer may be charged a fee by a third party tester in order to receive the report. Accordingly, the application developer may gain access to the application testing tool's capabilities upon paying the fee. The application developers may find that the benefits associated with autonomously testing the application's functionality with ease merits the cost associated with using the application testing tool. In addition, the ability to essentially have a plurality of users test the application may be valuable to the application developer.

In one configuration, an updated version of the application may be released on the online application store. For example, the application developer may change 10% of the application when creating the updated version. While some of the application elements may remain the same (e.g., certain pages or buttons), other application elements may be changed in the updated version. Users may be allowed to explore the updated version of the application for a limited time period or trial period via the application testing platform. When the updated version is released, the user interaction capturing module 410 may continue to capture the user interactions 412 for the updated version of the application. In this case, the testing of the application may be performed using more recent user interactions 412 (e.g., after the updated version is released), as well as previous user interactions 412 (e.g., from before the updated version was released). The hierarchical tree module 420 may continually modify the hierarchical tree 422 as the user interactions 412 are captured for the updated version of the application. For example, the hierarchical tree module 420 may add nodes 424 to the hierarchical tree 422 to represent new application elements in the updated version of the application. Similarly, nodes 424 corresponding to application elements that are no longer present in the updated version may be removed from the hierarchical tree 422. Nodes 424 may change in density based on the number of user interactions 412 with application elements of the updated version.

As more recent user interactions 412 for the updated version of the application are captured, the node selection module 430 may modify which nodes 424 are selected from the hierarchical tree 422 using the priority rules 434. In other words, the more recent user interactions 412 may indicate new failures, changes in which application elements are now more popular or less popular, etc. In one example, if certain application elements that were previously popular do not receive any interaction in the updated version of the application, then these application elements may be inferred as being removed from the updated version, and therefore, the corresponding nodes 424 may be removed from the hierarchical tree 422. Application elements that no longer receive significant user interaction in the updated version may slowly fade in importance, and as a result, the corresponding nodes 424 may cease to be selected based on the priority rules 434. Therefore, when updated versions of the application are released, the priority rules 434 may indicate that more recent user interactions 412 are prioritized higher than older user interactions 412. Based on a modified set of prioritized nodes selected from the hierarchical tree 422, the subset identification module 440 may modify the subset of user interactions 442. In other words, the subset may include user interactions 412 for newly prioritized nodes 424, as well as previous nodes 424 that remain prioritized, even with the release of the updated version of the application. The playback module 450 may play back the user interactions in the subset in order to verify the functionality of the updated version of the application. Therefore, even when features change in updated versions of the application, the continuous capturing of user interactions 412 may facilitate the automated testing of the application.

In one example, if the updated version of the application is a complete overhaul as compared to the previous version (e.g., substantially no overlapping application elements), then the hierarchical tree 422 may be recreated during a learning period. During this period of time, the user interactions 412 may be captured and used to create a playback stream for testing the updated version of the application.

Figure 5:
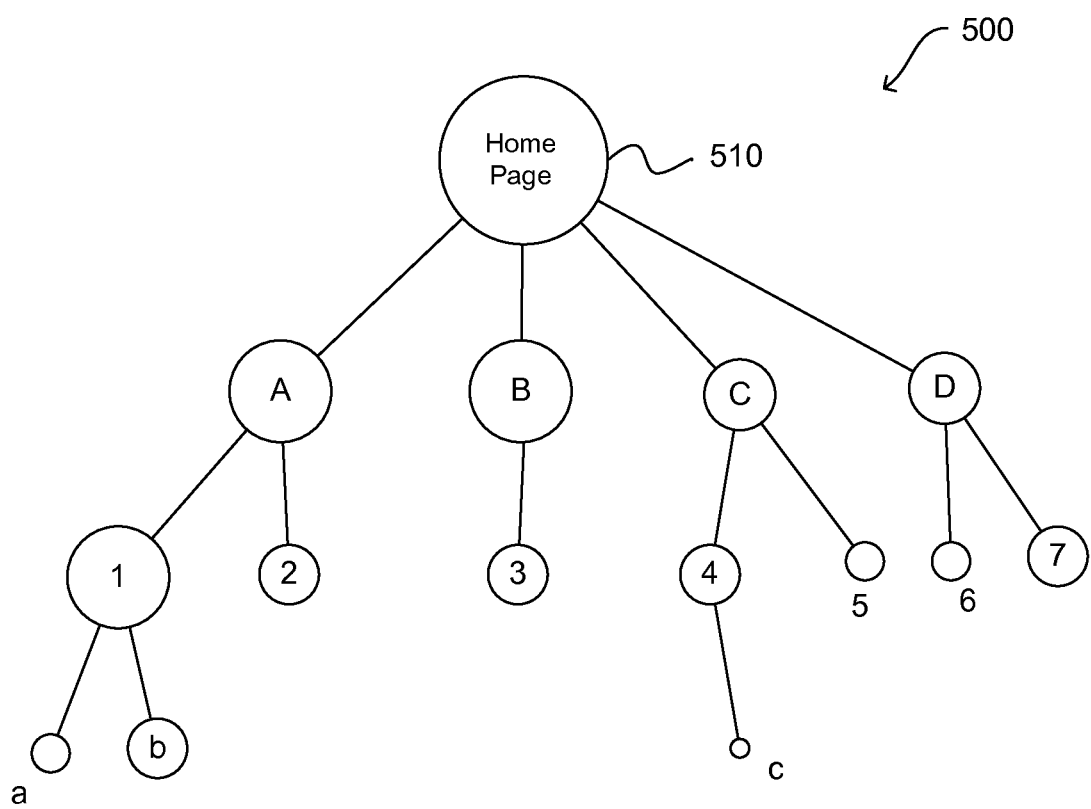
FIG. 5 illustrates a hierarchical tree having nodes to represent application elements of an application according to an example of the present technology.

FIG. 5 illustrates an exemplary hierarchical tree 500 having nodes 510 to represent application elements of an application. The hierarchical tree 500 may be created based on user interactions captured for the application over a period of time. The hierarchical tree 500 may represent user interactions from a plurality of users that interact with the application. Each application element that has received a user interaction may be represented by a node 510. As an example, the hierarchical tree 500 may include a node 510 that is associated with a home page. When the application is launched, the home page may be the first page that is accessed. Therefore, users that interact with the application may initially interact with the home page. The node 510 may be associated with a density based on a number of user interactions that are associated with the node 510. In the example shown in FIG. 5, the nodes may be represented using circle sizes that correspond to the densities. In this example, since the node 510 is associated with the home page, the node 510 may have a highest density as compared to the other nodes in the hierarchical tree 500.

From the home page, a user may access application elements A, B, C or D. These application elements may be distinct screens, pages, or user interface controls in the application. While some users may interact with application element A, other users may interact with application element C, etc. In order to transition between different nodes (or different states in the application), the users may perform certain navigation commands, such as clicks, selections, etc. to navigate between application elements. For example, a user on application element A may click an icon in order to transition to application element 1. In another example, the user may navigate from application element c to application element 2 via a series of navigation commands (e.g., clicks, gestures, swipes). The hierarchical tree 500 may represent each of these user interactions with the application elements with respect to a plurality of users that interact with the application.

Figure 6:
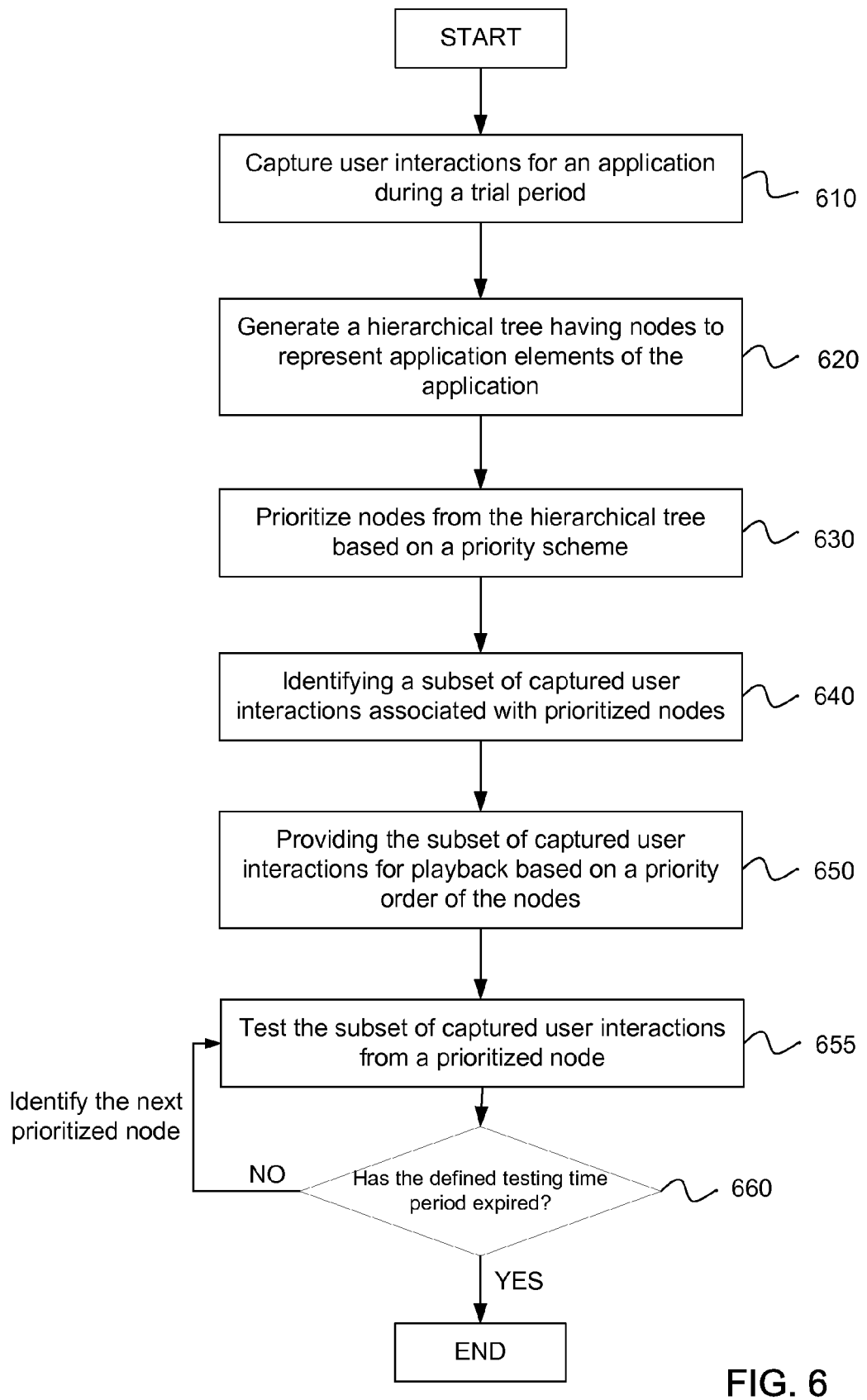
FIG. 6 is a flowchart of an example method for regression testing of an application.

FIG. 6 illustrates an example of a method for regression testing of an application. A plurality of user interactions for the application may be captured, as in block 610. The user interactions may be captured when application elements of the application are interacted with during a time limited trial period offered for using the application prior to purchase. The application may be executed on a computing service environment during the time limited trial period.

A hierarchical tree having nodes may be generated, in memory, to represent the application elements of the application that are interacted with during the time limited trial period, as in block 620. The application elements may be particular states of the application, such as screens, pages, stages, levels, zones, virtual worlds, etc. A user may transition between application elements of the application via navigation commands. Each node of the hierarchical tree (which represents a corresponding application element) may be associated with a number of captured user interactions.

Nodes from the hierarchical tree may be prioritized based on a defined priority scheme, as in block 630. Nodes that indicate potential failures may be prioritized with a first priority or the highest priority. The nodes for which the number of captured user interactions exceeds a defined threshold may be prioritized with a second priority (i.e., less prioritized than nodes indicating application elements with potential failures). Nodes with an increased depth in the hierarchical tree may be prioritized with a third priority.

A subset of captured user interactions associated with prioritized nodes that are selected from the hierarchical tree using the defined priority order may be identified, as in block 640. In one example, the subset of captured user interactions may include captured user interactions that are substantially distinct from other captured user interactions in the subset. The subset may include captured user interactions for each of the nodes selected from the hierarchical tree.

The subset of captured user interactions may be provided for playback based on a priority order of the nodes in order to verify a functionality of the application via regression testing, as in block 650. Accordingly, the subset of captured user interactions associated with a prioritized node may be tested, as in block 655 during a defined testing time period. As many nodes as possible may be tested during the defined testing time period. The defined testing time period may be set based on an application category or a user popularity level of the application.

A determination as to whether the defined testing time period has expired may be performed, as in block 660. If the defined testing time period has expired, then regression testing for the application may be completed. If the defined testing time period has not expired, additional user interactions for the next prioritized node may be played back to further test the application. The additional user interactions associated with prioritized nodes may be played back until the defined testing time period has expired.

In one configuration, additional user interactions with application elements of an updated version of the application may be captured. The hierarchical tree may be modified to include nodes that represent the application elements of the updated version of the application. Updated nodes may be selected from the hierarchical tree in accordance with the defined priority order. The subset of captured user interactions may be modified to include captured user interactions for the updated nodes. The subset of captured user interactions may be provided for playback based on a priority order of the updated nodes in order to verify the functionality of the updated version of the application via regression testing.

Figure 7:
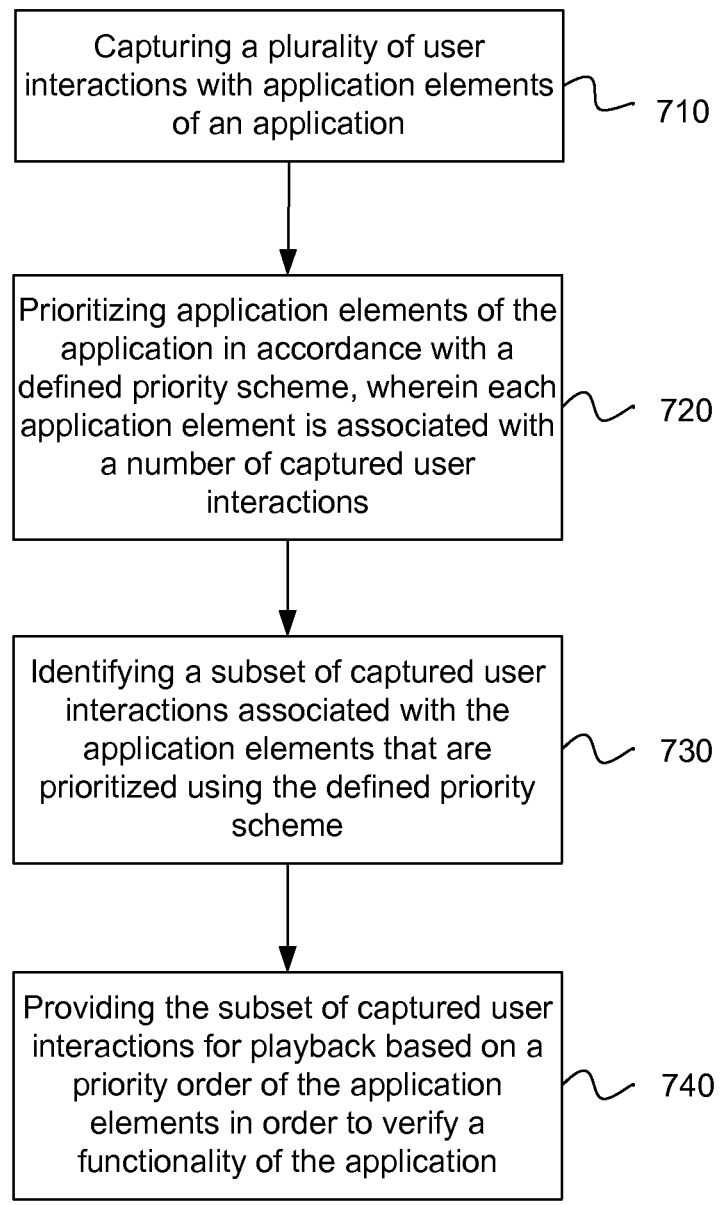
FIG. 7 is a flowchart of an example method for testing an application.

FIG. 7 illustrates an example of a computer implemented method for testing an application. A plurality of user interactions with application elements of an application may be captured, as in block 710. The user interactions may be captured from a group of users exploring the application during the time limited trial period offered prior to purchase of the application. The application may be executed on a computing service environment during the time limited trial period. In some examples, a list of application elements interacted with during the time limited trial period may be captured and/or a set of coordinates for user clicks performed with the application elements on the list during the time limited trial period may be captured.

Application elements of the application may be prioritized in accordance with a defined priority scheme, as in block 720. Each application element may be associated with a number of captured user interactions. Application elements that indicate potential failures may be prioritized with the highest priority. In addition, the application elements for which the number of captured user interactions exceeds a defined threshold may have a second priority or be less prioritized than application elements with potential failures. The application elements with an increased level may have a third priority. In one example, the application elements may selected from the application in accordance with a reduced priority order when the number of captured user interactions associated with the application elements is reduced.

In one configuration, a hierarchical tree having nodes may be generated, in memory, to represent the application elements of the application that are interacted with during the time limited trial period. Each application element included in the hierarchical tree may be associated with a number of captured user interactions. The application elements may be selected from the hierarchical tree in accordance with the defined priority order.

A subset of captured user interactions may be identified, as in block 730. The subset of captured user interactions may be associated with the application elements that are selected using the defined priority scheme. In one example, the captured user interactions in the subset used for playback may be distinct from other captured user interactions in the subset.

The subset of captured user interactions may be provided for playback based on a priority order of the application elements in order to verify a functionality of the application, as in block 740. In one example, the subset of captured user interactions may be provided for playback in accordance with a testing time period that is defined based on an application category or a user popularity level of the application. In another example, the functionality of the application may be automatically verified using regression testing when a popularity level of the application at an electronic application store is above a defined level or is expected to reach the defined level.

In one example, a notification may be generated when the functionality of the application is failing at one or more application elements of the application. The notification may be provided to an application developer. In another example, a regression testing tool may be offered for sale to an application developer. The regression testing tool may be capable of verifying the functionality of the application using the subset of captured user interactions.

In one configuration, additional user interactions with application elements of an updated version of the application may be captured. Application elements may be selected from the updated version of the application in accordance with the defined priority order. The subset of captured user interactions may be modified to include captured user interactions that are associated with the application elements selected from the updated version of the application. The subset of captured user interactions may be provided for playback based on a priority order of the application elements in order to verify the functionality of the updated version of the application.

Figure 8:
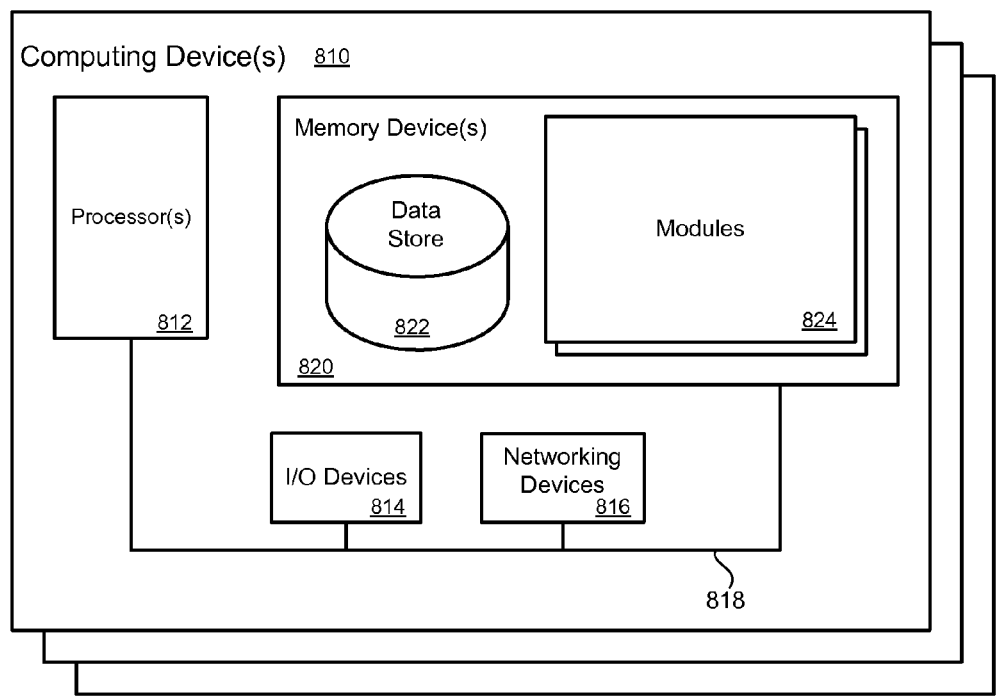
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for regression testing of an application, the method comprising:
    under control of one or more computer systems configured with executable instructions;
    capturing, using one or more processors of the computer systems, a plurality of user interactions for the application, the user interactions being captured when application elements of the application are interacted with during a trial period offered for using the application prior to purchase;
    generating, using the one or more processors of the computer systems, a hierarchical tree having nodes, in memory, to represent the application elements of the application that are interacted with during the trial period, wherein each node of the hierarchical tree is associated with a number of captured user interactions;
    prioritizing nodes, using the one or more processors of the computer systems, from the hierarchical tree based on a priority scheme, wherein nodes that indicate potential failures may be prioritized with a first priority, nodes for which the number of captured user interactions exceeds a threshold may have a second priority, and nodes with an increased depth in the hierarchical tree may have a third priority;
    identifying, using the one or more processors of the computer systems, a subset a captured user interactions associated with prioritized nodes that are selected from the hierarchical tree using the priority scheme; and
    providing, using the one or more processors of the computer systems, the subset of captured user interactions for playback based on a priority order of the nodes in order to verify a functionality of the application via regression testing.

2. The method of claim 1, further comprising providing the subset of captured user interactions associated with the prioritized nodes for playback in accordance with a testing time period.

3. The method of claim 1, further comprising:
    capturing additional user interactions with application elements of an updated version of the application;
    modifying the hierarchical tree to include nodes that represent the application elements of the updated version of the application;
    selecting updated nodes from the hierarchical tree in accordance with the priority scheme;
    modifying the subset of captured user interactions to include captured user interactions that are associated with the updated nodes; and
    providing the subset of captured user interactions based on a priority order of the updated nodes for playback in order to verify the functionality of the updated version of the application via regression testing.

4. A system for regression testing of an application, the system comprising:
    a processor;
    a memory device including a data store to store a plurality of data and instructions that, when executed by the processor, cause the processor to:
    capture user interactions when application elements of the application are being interacted with during a trial period;
    generate a hierarchical tree having nodes to represent the application elements of the application that are interacted with during the trial period;
    prioritize nodes from the hierarchical tree based on a priority scheme, wherein nodes that indicate potential failures may be prioritized with a first priority, nodes for which a number of captured user interactions exceeds a threshold may have as second priority, and nodes with an increased depth in the hierarchical tree may have a third priority;
    identify a subset of captured user interactions associated with the nodes that are prioritized from the hierarchical tree in accordance with the priority scheme; and
    provide the subset of captured user interactions for playback based on a priority order of the nodes in order to verify functionality of the application via regression testing.

5. The system of claim 4, wherein the plurality of data and instructions, when executed by the processor, cause the processor to: provide the subset of captured user interactions for playback in accordance with a testing time period.

6. The system of claim 4, wherein the plurality of data and instructions when executed by the processor, cause the processor to: capture the user interactions from a group of users exploring the application during the trial period offered prior to purchase of the application.

* * * * *